United States Patent [19]
Poorman

[11] Patent Number: 6,067,212
[45] Date of Patent: May 23, 2000

[54] TAPE DRIVE HEAD CLEANER EMBEDDED IN CARTRIDGE/DRIVE LEADER BLOCK

[75] Inventor: Paul W. Poorman, Meridian, Id.

[73] Assignee: Hewlett-Packard Company, Palo Alto, Calif.

[21] Appl. No.: 09/139,623

[22] Filed: Aug. 25, 1998

[51] Int. Cl.⁷ .................................................. G11B 5/41
[52] U.S. Cl. ........................................................ 360/128
[58] Field of Search ........................................... 360/128

[56] References Cited

U.S. PATENT DOCUMENTS 3,931,643   1/1976   Huroe ...................................... 360/128

OTHER PUBLICATIONS

U.S. pending application S/N: 08/896,848; Darrel R. Bloomquist et al; "Integrated Cleaning and Leader Tape"; filed: Jul. 17, 1997; Attorney Docket No. 10970416–1.

U.S. pending application S/N: 09/042,323; James C. Anderson; Head Cleaner For Linear Tape Drive; filed: Mar. 13, 1998; Attorney Docket No. 10971916–1.

U.S. pending application S/N: 09/038,299; Darrel R. Bloomquist; "Tape Drive Cleaning Cartridge With Data Tape Leader"; filed Mar. 10, 1998; Attorney Docket No. 10980456–1.

U.S. pending application S/N: 09/010,418; Geoffrey W. Mansbridge; "The Block and take–Up Reel Assembly For A Magnetic Tape Transport System"; filed Jan. 21, 1998; Attorney Docket No. 10971133–1.

*Primary Examiner*—Robert S. Tupper

[57] ABSTRACT

A tape drive, comprising a tape cartridge including a tape having a leader pin; a tape carrier including a leader block and a hub, the leader block coupled with the hub via a tape, the leader block configured to removably mate with the leader pin; and a cleaning surface provided on the leader block configured to be movably positioned into contact with a transducer head of the tape drive and operative to clean the transducer head. A method is also taught.

20 Claims, 6 Drawing Sheets

TAPE DRIVE HEAD CLEANER EMBEDDED IN CARTRIDGE/DRIVE LEADER BLOCK

FIELD OF THE INVENTION

This invention relates generally to tape recording and playback systems for magnetic storage devices, and more particularly to a system which uses a cartridge/drive leader block having a tape drive head cleaner embedded in the leader block configurable to effect improved cleaning of the tape head for a recording and playback mechanism.

BACKGROUND OF THE INVENTION

Recording/playback systems for magnetic medium are subject to degradation during use as a result of the accumulation of debris which occurs on the magnetic transducer head(s) of such systems. Transducer heads include magnetic read/write heads and associated read/write elements. For example, in high-performance magnetic tape recording devices, magnetic tape usually contacts the magnetic transducer head. High contact pressures are generated during operation between the magnetic tape and the transducer head which strips surface contamination and weakly-attached particles from the magnetic tape. This debris accumulates on the magnetic transducer head which causes spacing loss between the read/write elements and the tape magnetic recording layer. Spacing loss can result from slots within the magnetic head being filled with debris, which renders the slots no longer effective. Spacing loss can also result from piles of debris accumulating over the transducer head, which physically causes the tape to lift off of the head.

A number of different techniques have been developed to clean clogged transducer heads. Typically, a scrubber is employed in some manner to physically remove debris from the transducer head. Hence, there is a need to periodically clean the magnetic transducer head(s). Accordingly, there exist several techniques for cleaning a magnetic transducer head.

According to one prior art technique, a separate, dedicated "cleaning cartridge" is used to perform periodic cleaning of the recording transducer head by scrubbing the transducer head. A "cleaning cartridge" contains a supply of unrecorded abrasive tape, the cleaning cartridge being inserted into a hard drive and the abrasive tape being drawn across the transducer head to clean the head. Such cartridge can be used to clean one or more magnetic transducer heads. For example, the recording heads found on a tape drive can be cleaned with a "cleaning cartridge". In order to utilize a "cleaning cartridge", the recording/playback of the medium must be stopped, with the data cartridge being removed, and the cleaning cartridge being inserted. The "cleaning cartridge" is then run within the record/playback system so as to clean the recording transducer. Once cleaning is complete, the "cleaning cartridge" is removed, and a data cartridge is reinserted. Such implementation is inconvenient because backup cannot occur without the attendance of personnel to insert the cleaning cartridge and data cartridges. Furthermore, after the "cleaning cartridge" has been used, a new data cartridge must be loaded into the system in order to evaluate the performance of the magnetic transducer head so as to confirm that cleaning has been successfully completed.

Where the magnetic recording/playback system is a tape recording/playback system, the cleaning cartridge includes an abrasive cleaning tape that can cause excessive tape head wear. The abrasiveness of the cleaning tape can be adjusted in order to tailor its effectiveness. If the cleaning tape is made sufficiently effective to thoroughly remove debris from the read/write heads, then the cleaning tape should only be used when it is necessary; otherwise, excessive head wear will result. Such a problem can occur where a piece of abrasive cleaning tape is provided as a leader on a data tape cartridge such that each time a tape is used the leader is used to clean a read/write head.

According to another prior art technique, a cleaning device includes a mechanism containing a brush or pad that is configured to scrub the transducer head in order to remove contamination. However, such cleaning device mechanisms add complexity, cost and constraints to a tape drive. For example, extra levers, cams, springs, gears and connections can fail, thus impacting tape drive reliability. Similarly, extra motors are costly, and require power, wiring, control instructions, and space. Furthermore, many such cleaners can only operate when the cartridge is loaded, thus limiting the frequency with which cleaning can be performed and the length of cleaning time.

Where magnetic tape is used to store computer data, the presence of errors represents a significant problem even if the errors occur infrequently. In certain applications, the loss of data requires that a user be able to perform a cleaning operation in response to recognized drop-out errors, but does not immediately prevent use of the equipment prior to cleaning. In some cases, the loss of a single bit of computer data can be of significant importance, and recovery from such an error must be done in a manner that ensures error-free data storage and retrieval. While error correction is possible via error correction algorithms, data loss can still present problems to a user.

One form of magnetic storage comprises existing linear tape drives that are used for storage and retrieval of computer data. Such tape drives use a single reel in the form of a magnetic tape cartridge to house the magnetic tape media. A special leader or leader block is attached to the magnetic tape media at one end which enables the tape drive to extract the magnetic tape from the magnetic tape cartridge. "Leader tape" is typically constructed of a piece of thicker, stronger tape that is sometimes used between the magnetic storage tape and the hub reel. Leader tape has been used to perform various functions, including identification, timing and an ability to resist wear. Leader tape can be located anywhere along a segment of tape, although it is typically found at the ends of a reel of tape. Accordingly, the leader can form a "leader tape" at the leading end of a tape reel, or a "trailer tape" at a trailing end of a supply reel. For purposes of this disclosure, "leader tape" will be used to refer to placement of such a tape at either end of a magnetic tape media.

"Tape recorder" is intended to refer to one form of magnetic recording/playback system comprising magnetic tape transcription equipment.

Such equipment is understood to include standard tape recorders having fixed or movable heads, as well as arcuate scan and helical scan transcription equipment as is typically used in analog and digital tape recorders. According to one implementation, a linear transcription head is employed, although such invention has application in other tape recording environments. As described here, "transcription" is intended to mean read and/or write operations that are performed with a tape recorder, and is not intended to be limited to a particular use or format for data.

Another prior art magnetic tape recording/playback system includes music cassette tapes that are often configured to include special material presented on a leader tape. Such music cassette tapes are configured with leader tapes that are presented over a head at the beginning sequence of operating the tape. Such leader tapes have been provided with a limited amount of abrasive cleaner. However, if the leader tape is provided with an abrasive cleaner having sufficient strength for cleaning a tape head, the leader tape will tend to cause undue wear to the tape head. Such undue wear results because each use of the tape is not selective and will cause abrasive cleaning, whether it is necessary or not. Therefore, end-of-tape abrasive leaders have limited application in that the abrasiveness, or cleaning effectiveness, must be reduced so that excessive wear does not occur to the tape head. Furthermore, there is no capability for determining whether a head needs to be cleaned, or whether or not a head has been sufficiently cleaned.

It is therefore desirable to employ a tape drive cleaning device that is simple, consumes little space, requires no additional motors or mechanisms, and can be operated at any time with no operator intervention. It is further desirable to implement such device so that it is relatively simple, economical, easy to monitor and repair, and more reliable in operation.

SUMMARY OF THE INVENTION

The invention provides a device and method for ensuring cleaning of transducer heads on a magnetic storage system such as magnetic heads on a tape drive system.

One aspect of the invention provides a tape drive, comprising a tape cartridge including a tape having a leader pin; a tape carrier including a leader block and a hub, the leader block coupled with the hub via a tape, the leader block configured to removably mate with the leader pin; and a cleaning surface provided on the leader block configured to be movably positioned into contact with a transducer head of the tape drive and operative to clean the transducer head.

Another aspect of the invention provides a linear tape drive, comprising a transducer head; a tape carrier configured to carry a tape across the transducer head; a leader block coupled with the tape carrier via a tape; and a cleaning surface provided on the leader block and configured to engage with the transducer head to impart cleaning thereto.

Yet another aspect of the invention provides a method for cleaning a transducer head on a tape drive, comprising the steps of providing a tape cartridge having a tape and a leader pin; providing a tape drive having a leader block including a cleaning surface; receiving the tape cartridge into the tape drive and engaging the leader pin with the leader block; positioning the leader block cleaning surface into engagement with a transducer head to be cleaned; and moving at least one of the leader block and the transducer head to effect cleaning of the transducer head.

DESCRIPTION OF THE DRAWINGS

Preferred embodiments of the invention are described below with reference to the following accompanying drawings depicting examples embodying the best mode for practicing the invention.

DETAILED DESCRIPTION OF THE INVENTION

This disclosure of the invention is submitted in furtherance of the constitutional purposes of the U.S. Patent Laws "to promote the progress of science and useful arts". U.S. Constitution, Article 1, Section 8.

Figure 1:
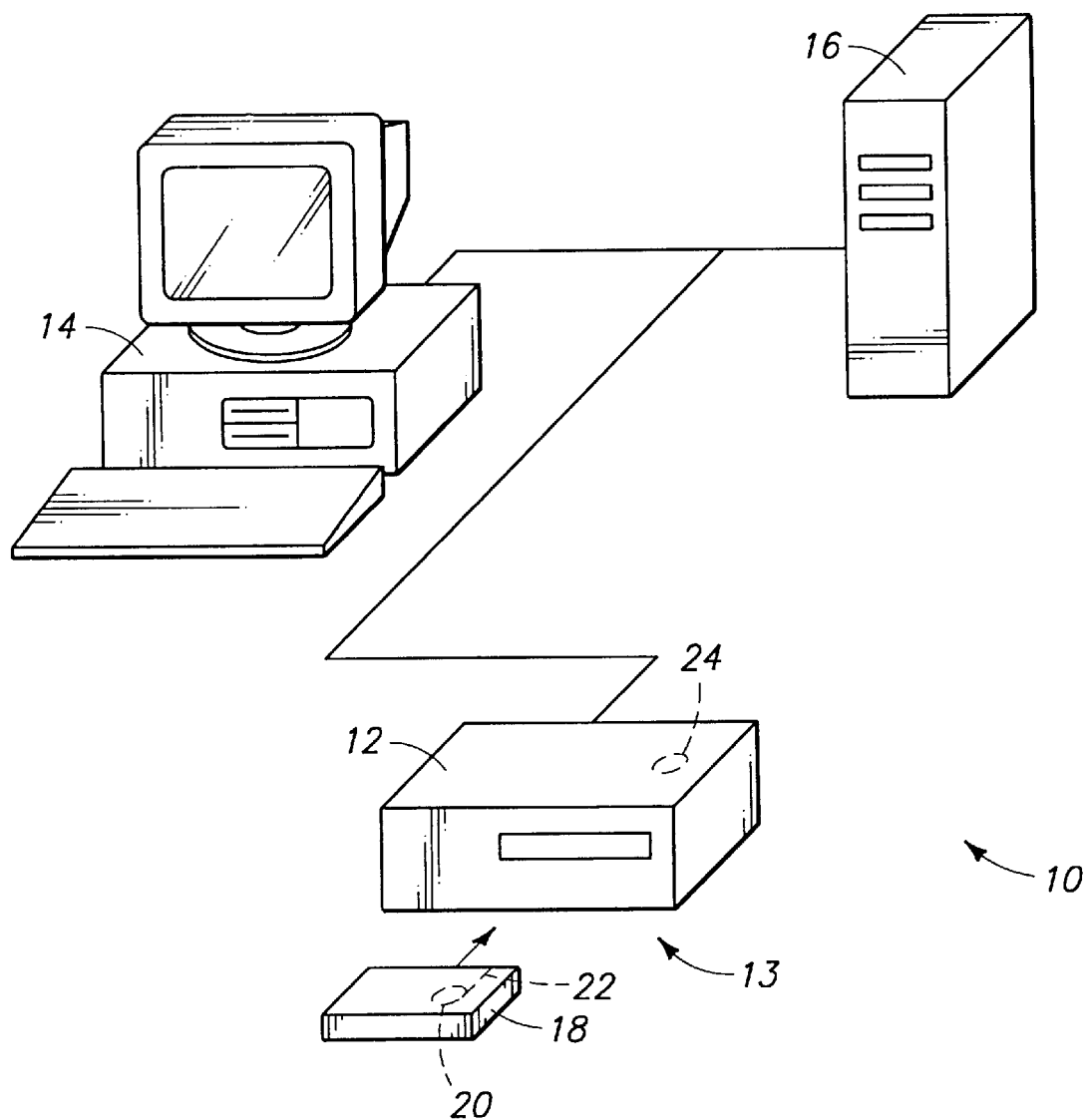
FIG. 1 is a perspective view of a computer network environment including a data storage device embodying the invention.

FIG. 1 illustrates a computer network environment 10 including a data storage device, or system, 12 having a transducer head cleaner 13 embodying this invention, and including a computer 14 and a network server 16. Computer 14 is configured to read data from and write data to data storage device 12. Additionally or optionally, server 16 is configured to read data from and write data to data storage device 12. Computer 14 and network server 16, together or individually, form a host system that is connected with data storage device 12. According to one embodiment, data storage device 12 comprises a data storage/retrieval device configured in the form of a stand-alone computer tape drive. According to another embodiment, data storage device 12 comprises a computer tape drive system that is supported in a bay inside a housing of computer 14 or server 16.

As illustrated in FIG. 1, data storage device 12 is a linear recording tape drive. Although the one embodiment illustrated in FIG. 1 is employed in a computer data storing magnetic tape drive system, the invention is understood to have a wide variety of applications, including any form of tape drive system using a leader block. For example, certain aspects of the invention can be used in connection with other magnetic storage media, for storing either analog or digital information. Some aspects of the invention can be employed, for example, in connection with any of a variety of types of storage devices having read and/or write heads and tape leader blocks, including linear, helical and serpentine tape drives. For purposes of illustration, the invention will be described in connection with a computer magnetic tape drive.

As shown in FIG. 1, tape drive 12 is configured to be used with tape cartridges such as a data cartridge 18. In the illustrated embodiment, data cartridge 18 is a single-reel type tape cartridge. Such tape data cartridge 18 includes a tape carrier in the form of a reel 20, and tape 22 wound onto reel 20. A second reel 24 is included in tape drive 12, and is configured to engage tape 22. Second reel 24 cooperates with first reel 20 to form a tape carrier. According to one implementation, tape 22 is configured with a width, W, of one-half inch. Such tape 22 has a length extending in a direction perpendicular to width W, with a plurality of parallel tracks being defined across the width of tape 22. Such tracks extend in the direction of the length of tape 22, and are used for storing data as well as storing servo information.

Figure 2:
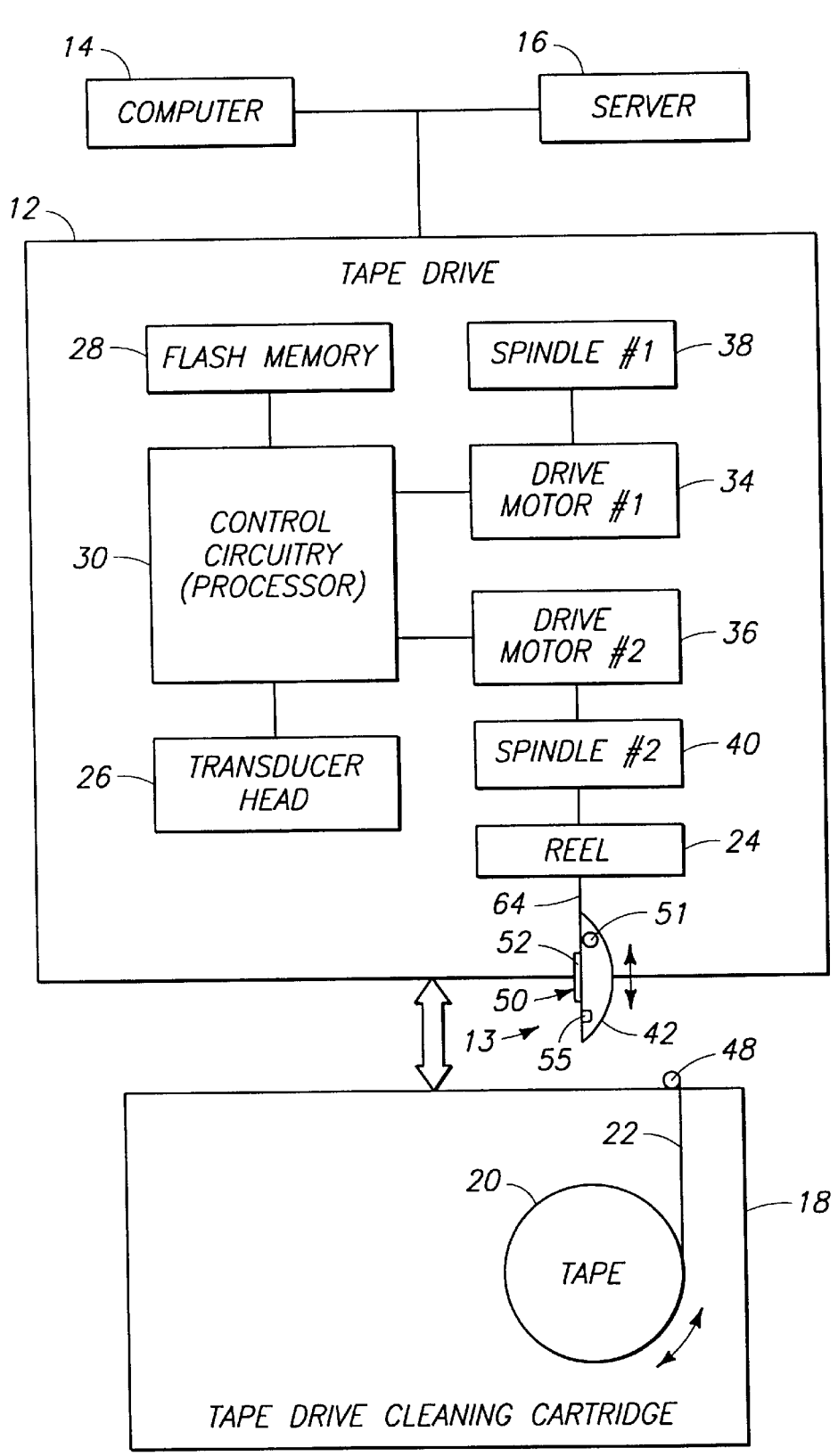
FIG. 2 is a schematic block diagram illustrating in further detail the tape drive system and tape drive cleaning mechanism of FIG. 1, configured for cleaning a magnetic transducer head.

As shown in FIG. 2, it is understood that computer tape drive 12 includes a magnetic transducer head (or tape head)

26 that contains a plurality of read/write elements for reading data from or writing data to tape 22 of cartridge 18. Magnetic tape head 26 comprises a transducer head. A plurality of servo elements are configured on transducer head 26 for reading servo code from tape 22. Additionally, such servo elements on the transducer head are configured for reading servo information as well as data from a portion of tape 22. The performance of individual transducer heads can be tested using a segment of data tape by writing and reading data from tape 22 in order to verify that head cleaning is required, or that head 26 has been sufficiently cleaned.

Figure 3:
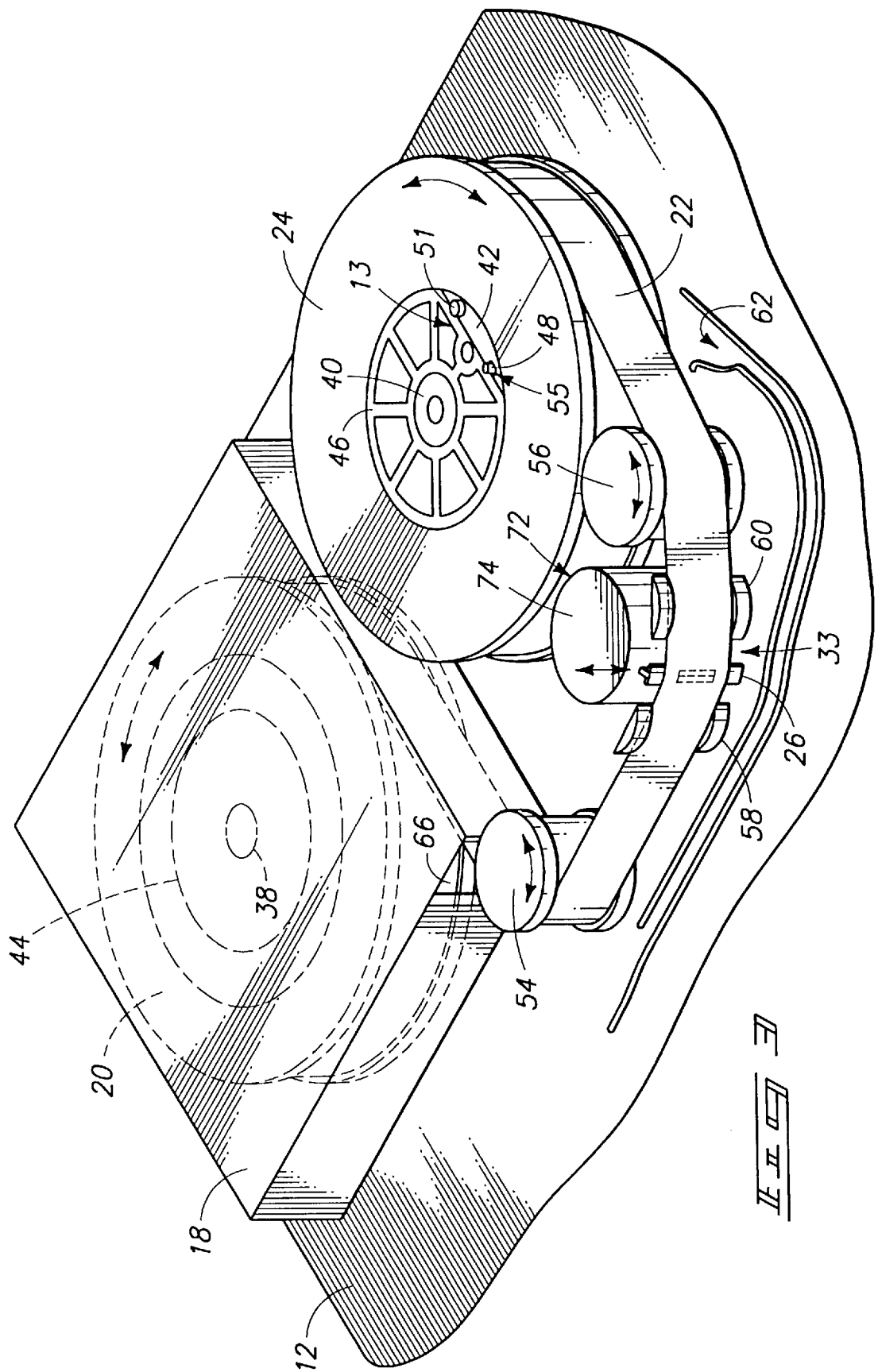
FIG. 3 is a simplified partial perspective view of an inside of a linear tape drive in which a data tape cartridge is received, and showing the cleaning device of this invention provided in association with the tape drive mechanism of the tape drive.

According to FIG. 2, a tape carrier 23 is provided for moving tapes 22, 64 between cartridge 18 and tape drive 12. According to one implementation, tape carrier 23 includes control circuitry 30, drive motors 34, 36, spindles 38, 40, and reels 20–24, respectively. Such tape carrier is utilized in Applicant's invention as a structural feature that presently exists between a tape drive 12 and a cassette 18. Additionally, a linear actuator 72 (as shown in FIG. 3) is also presently existing on tape drive 12, and is used to implement features of Applicant's invention. Therefore, a cost savings is incurred by utilizing presently-existing components when implementing Applicant's invention. In contrast, prior art designs need to provide additional components when forming a transducer head cleaner.

FIG. 2 illustrates in block diagram form one embodiment of the invention implemented as a transducer head cleaner 13 and associated with tape drive data cartridge 18 and computer magnetic tape drive 12. Tape drive 12 is signal-coupled with computer 14 and server 16 for transmitting data pertaining to read/write operations. Tape drive 12 contains control circuitry (a processor) 30, flash memory 28, transducer head 26, a pair of drive motors 34 and 36, and a pair of associated drive spindles 38 and 40, respectively.

According to one construction, control circuitry 30 comprises a 16-bit microprocessor. Additionally, flash memory 28 comprises 300K bytes of flash memory. Such flash memory receives operating algorithms that run tape drive 12. Additionally, a cleaning algorithm described below with reference to FIG. 7 is also resident in flash memory 28, along with other standard algorithms that enable functionality of the tape drive, involve the tape in some way, enable reel drive motor calibration via encoder or sensor calibration, and enable start-up of tape drive 12.

Drive motors 34 and 36 are each coupled for mated rotation with an associated spindle 38 and 40, respectively, to drive each spindle in rotation. Each spindle 38 and 40 engages and moves one of reels 20 and 24, respectively, in rotation. One motor is used to drive tape 22 in one direction, and the other motor is used to drive tape 22 in an opposite direction. Sensors (not shown) detect relative movement of drive motors 34 and 36, respectively. According to one construction, such sensors comprise Hall-effect position sensors which monitor rotation of electric drive motors 34 and 36.

Spindles 38 and 40 are configured to drive reels 20 and 24 such that tape 22 is transported between reels 20 and 24 as shown in FIG. 2. A sensor (not shown) on each spindle enables determination of the axial movement of tape 22 between such reels by monitoring motion of each reel 20 and 24. By monitoring the motion of each reel 20 and 24 via associated sensors, a relatively accurate calibration can be performed which enables determination of the exact placement of tape 22 across a tape transducer head 26 of tape drive 12.

In order to implement Applicant's invention, a tape drive leader block 42 is positioned via placement of tape 22, as discussed above, such that a transducer head cleaner 13 contacts transducer head 26. More particularly, such tape drive leader block 42 is removably affixed to data tape 22 by a leader pin 48. Furthermore, leader block 42 is permanently affixed to a leader tape 64 carried on reel 24. Details of such construction are discussed below in greater detail with reference to FIGS. 3–6.

It is understood that spindles 38 and 40 are each provided within tape drive 12 such that a pair of hubs, or reels, 20 and 24 can be driven to move a tape, such as data tape 22 and/or leader tape 64, across a magnetic tape transducer head 26. Similarly, reels 20 and 24 can be driven by spindles 38 and 40, respectively, to position leader block 42 such that transducer head cleaner 13, comprising a cleaning surface 50, is positioned into contact with transducer head 26. Relative movement is then imparted between transducer head 26 and cleaning surface 50 so as to impart cleaning to head 26. Hence, there is no need to unload data tape 22 and data cartridge 18 from tape drive 12 during a cleaning operation.

For the case of a single-reel type tape cartridge, one reel 20 is contained within a cartridge 18, and another reel 24 is contained within tape drive 12 (see FIGS. 1 and 3). Spindles 38 and 40 are configured to engage and drive each reel 20 and 24, respectively, in rotation such that a tape can be driven between the pair of reels while it is being presented across a tape transducer head 26.

It is understood that the novelty of this invention lies in having a device capable of moving leader block 42 in proximity with transducer head 26 such that a cleaning surface 50 imparts cleaning to head 26 as relative movement is induced between surface 50 and head 26. Such cleaning does not require the unloading of data tape 22 from tape drive 12, or retraction of data tape 22 into tape cartridge 18, following removal from tape drive 12. Accordingly, cleaning can be imparted to transducer head 26 without having to spool a tape back into its cartridge.

As shown in FIGS. 2 and 3, it is understood that transducer head cleaner 13 includes a leader block assembly, or leader block, 42. Leader block 42 enables loading and unloading of tape 22 during loading and unloading of data cartridge 18 within tape drive 12. Details of many different types of leader block assemblies are well understood in the art. Details necessary to understand implementation of this invention are disclosed below, and further details are not disclosed wherein they do not relate to the novel aspects of this invention. One such leader block assembly is disclosed in U.S. patent application Ser. No. 09/010,418, filed on Jan. 21, 1998, and entitled "Tape Block and Take-Up Reel Assembly for a Magnetic Tape Transport System". This U.S. patent application Ser. No. 09/010,418 is herein incorporated by reference. It is understood that any one of a number of commercially available leader block assemblies can be used to support a cleaning surface 50 so as to implement transducer head cleaner 13 when implementing the features of this invention.

FIG. 3 illustrates the manner in which data tape 22 is rolled onto reel 24 from cassette 18 such that data tape 22 is presented over transducer head 26. Accordingly, tape 22 is stored within a housing of cartridge 18 when not in use. As shown, hub 46 enables retraction of tape 22 from reel 20 and into tape drive 12. The design of such a single-reel type tape cartridge is well understood in the art.

More particularly, hub 46 is configured to mate with leader block 42 when data tape 22 is unwound from reel 20 and onto reel 24. Details of such construction are well understood in the art, and are further depicted and described with reference to FIG. 6. Leader block 42 and hub 46 cooperate to form a cylindrical outer surface suitable for winding data tape 22 thereabout.

Leader block 42 removably couples with data tape 22 via leader pin 48. Additionally, a leader block pin 51 extends from a top and bottom surface of leader block 42. Leader block pin 51 is received within a pair of leader block tracks 62 provided along a top and bottom edge, and extending from cartridge 18 to take-up reel 24. Pin 51 guides leader block 48 within each leader block track 62 such that leader block 42 is guided past transducer head 26 such that contact does not occur thereabout.

Figure 4:
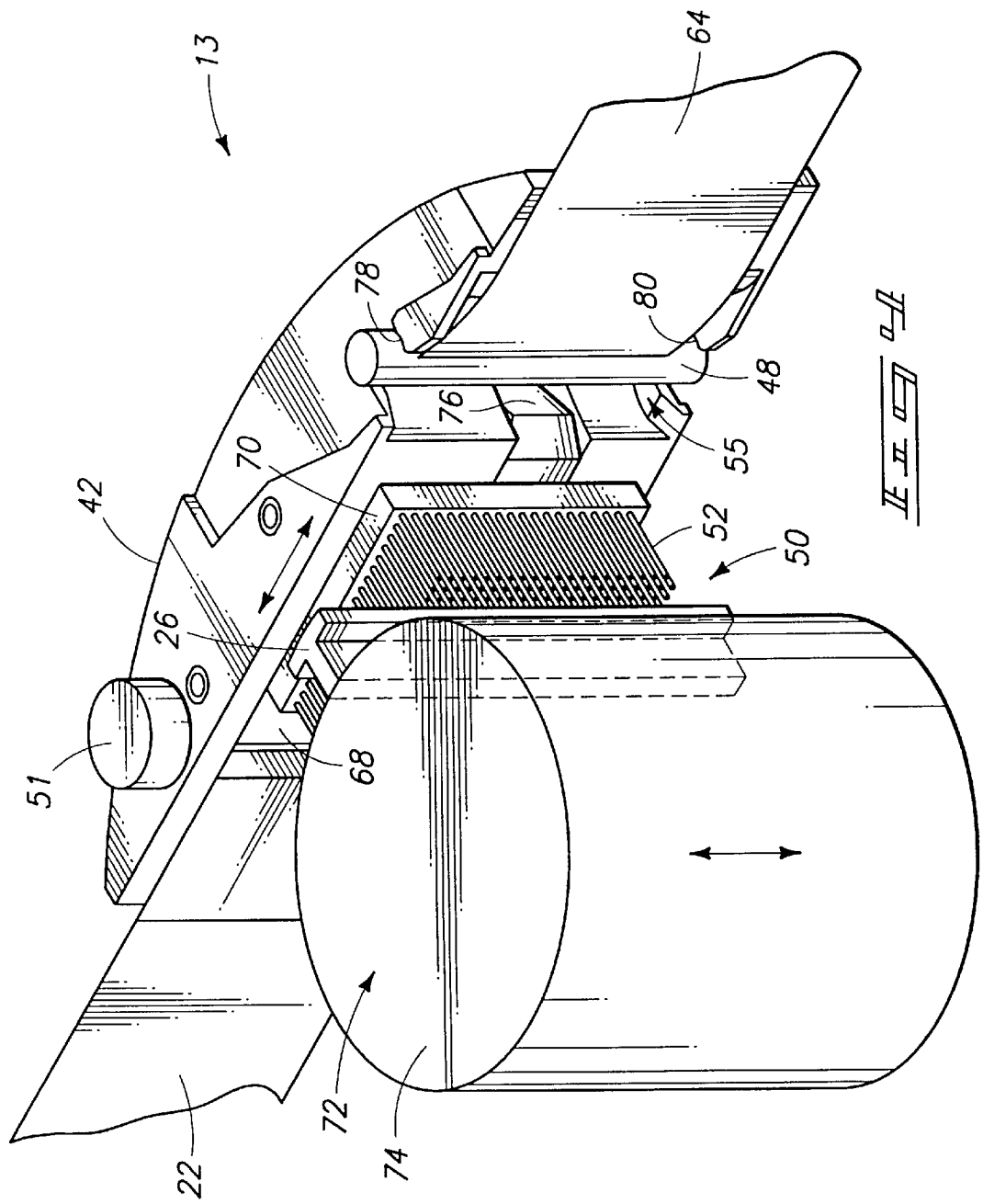
FIG. 4 is a partial perspective view of the transducer head cleaning device of FIG. 3, and showing a drive leader block with a cleaning surface movably engaged with a transducer head.
Figure 5:
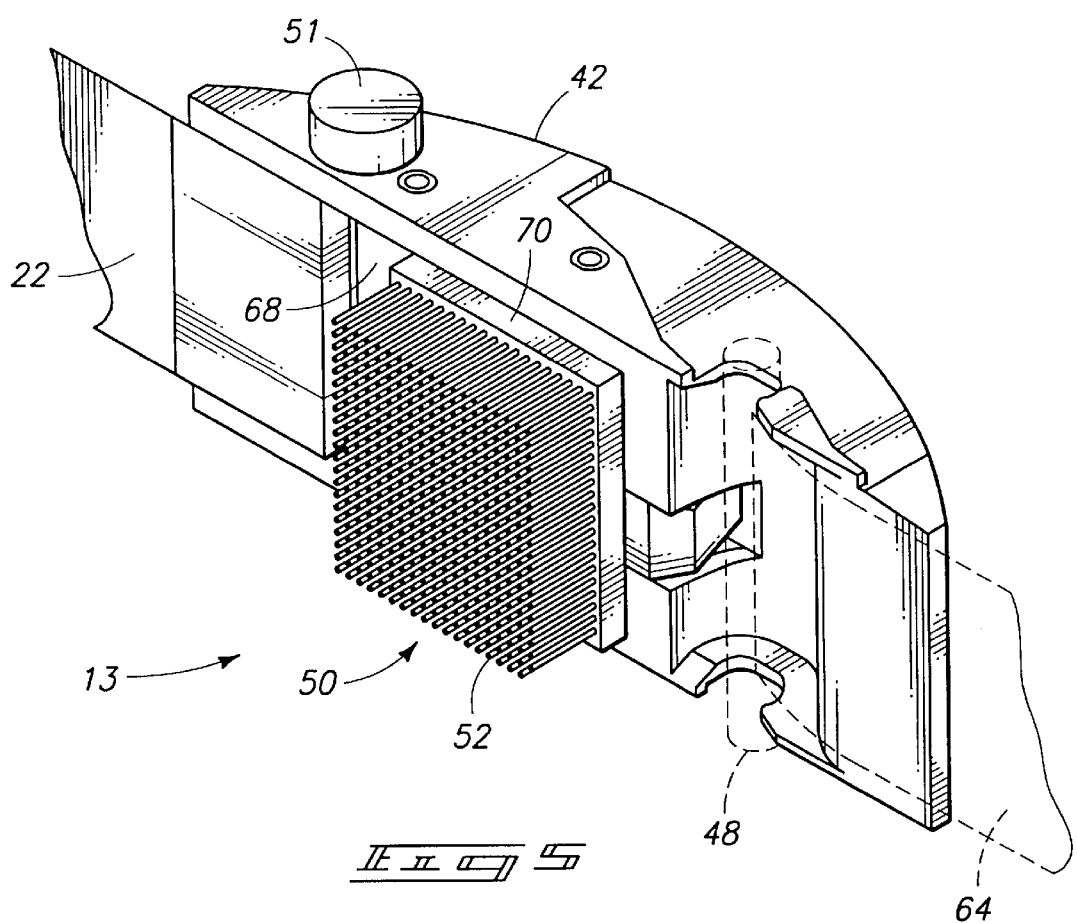
FIG. 5 is an enlarged partial perspective view of the drive leader block of FIG. 4, and showing a brush cleaning surface positioned on the block for cleaning a transducer head.
Figure 6:
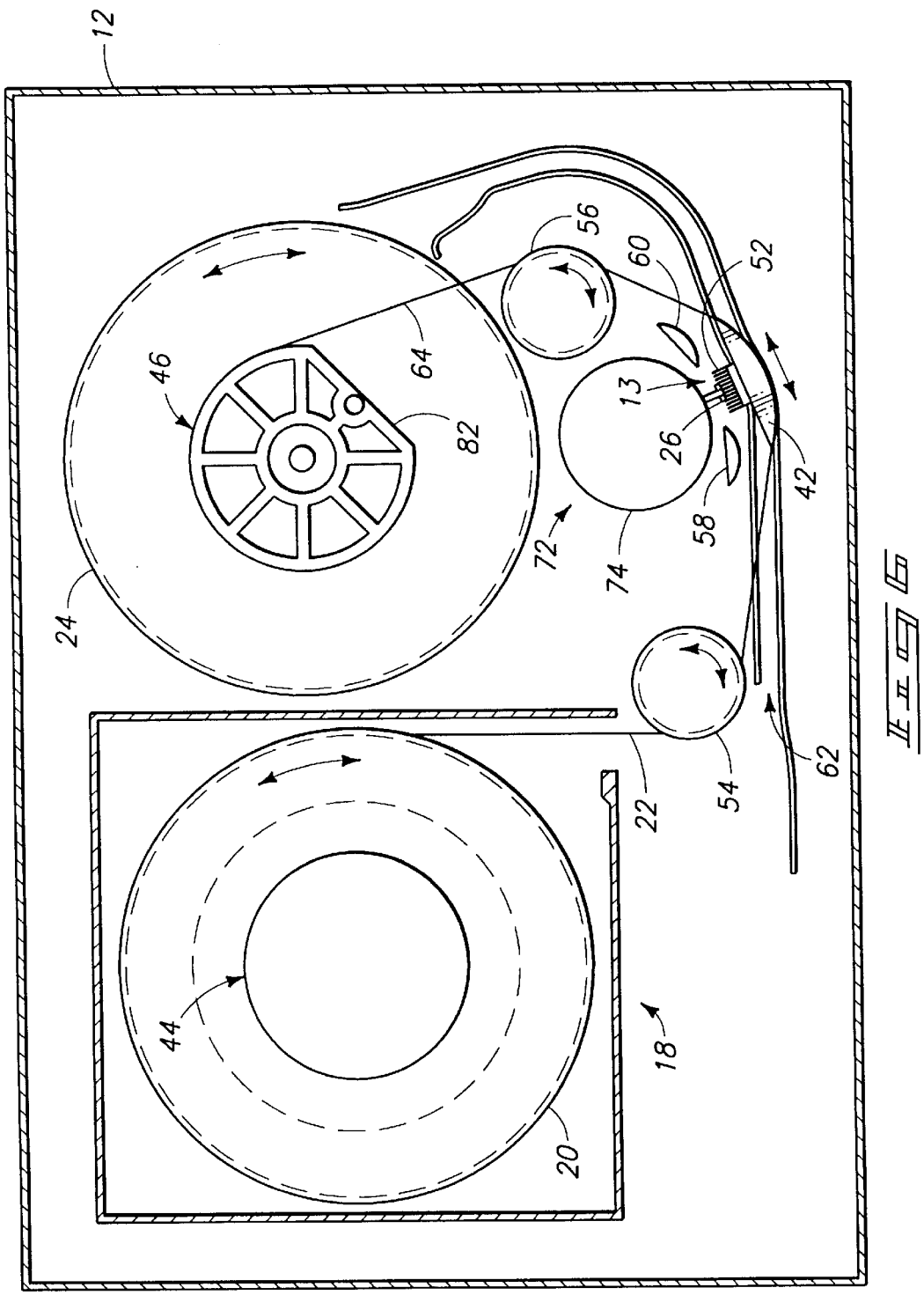
FIG. 6 is a schematic plan view illustrating the tape drive system and transducer head cleaning device of FIG. 3.

The design and construction of leader block track 62 are well understood in the art and are provided so as to prevent contact between leader block 42 and transducer head 26. Additionally, such track prevents contact with associated hardware, such as roller guide 56 and stationary guides 58 and 60. However, in accordance with Applicant's invention, a cleaning surface 50 (as shown in FIGS. 4–6) is provided on an inner surface of leader block 42 such that contact occurs between cleaning surface 50 and transducer head 26 when leader block 42 is positioned adjacent transducer head 26. Further details of such aspect are described below with reference to FIG. 4.

As shown in FIG. 3, tape 22 is supported by a tape carrier comprising reel 20 and reel 24, extending between data cartridge 18 and the support structure mechanisms of tape drive 12. Furthermore, roller guides 54, 56 and stationary guides 58, 60 cooperate to deliver tape 22 along a travel position situated directly against tape head 26. Movement of leader block 42 and pin 51 within tracks 62 displaces tape 22 adjacent leader block 42 from a natural operating travel position against head 26 to a retracted position such that leader block 42 can be presented adjacent transducer head 26 during a cleaning operation.

As shown in FIG. 3, tape 22 exits data cartridge 18 along an exit aperture 66 where the tape travels around roller guides 54 and 56, as well as stationary guides 58 and 60. Transducer head 26 is positioned between stationary guides 58 and 60 such that travel tension is applied to transducer head 26 by tape 22 during normal operation of tape drive 12. Such similar travel tension is used to securely position leader block 42 adjacent transducer head 26 during a cleaning operation.

Tape drive data cartridge 18 also includes cartridge resident circuitry comprising a semiconductor chip having circuitry including memory, transmitting/receiving circuitry and a passive antenna. According to one construction, such cartridge resident circuitry comprises a Memory-In-Cartridge (MIC). Such circuitry is configured with transmitting/receiving circuitry in combination with the antenna such that a proximity interface and antenna on tape drive 12 can communicate with the circuitry. One reason for communicating between such proximity interface and circuitry is to enable determination of when data cartridge 18 is inserted within tape drive 12. Another reason is to transmit information from tape drive 12 onto the memory, which records usage of data cartridge 18. Such usage information can be utilized in determining when transducer head 26 needs to be cleaned according to the teachings of Applicant's invention. Alternatively, such memory is signal coupled with a processor of control circuitry 30 (see FIG. 2) by a signal connector that couples between the cleaning cassette and the tape drive when the cleaning cassette is loaded.

As shown in FIG. 2 and for purposes of this disclosure, control circuitry (processor) 30, flash memory 28, and associated memory and circuitry resident on data cartridge 18 cooperatively and individually comprise circuitry that enables functionality of this invention, and further enables implementation of standard algorithms and a smart cleaning algorithm pursuant to this invention.

FIGS. 3 and 6 illustrate the physical appearance of reel 20 and tape 22, as implemented within data cartridge 18. It is understood that reel 20 and tape 22 of data cartridge 18 are constructed for reading/writing data and servo information. However, it is understood that tape 22 can include a tape leader and/or cleaning tape segments which further facilitate cleaning of a transducer head.

As illustrated in FIGS. 3 and 6, an inner end of tape 22, along reel 20 and adjacent hub 44, is physically wrapped around hub 44 several turns to facilitate securement of tape 22 to hub 44. As long as tape 22 is not completely unwound from hub 44, tension on tape 22 provides for securement.

An outer end of data tape 22 is secured to a leader pin 48 that removably engages with leader block 42 of tape drive 12 when data cartridge 18 is loaded/unloaded with tape drive 12. Data tape 22 is wrapped around leader pin 48, and a polymer layer wrapped around leader pin 48 and tape 22, and a steel spring keeper secure tape 22 within the resulting leader pin assembly including leader pin 48. Leader pin 48 is supported externally of data cartridge 18 such that tape drive 12 can readily engage leader pin 48 where pin 48 is received into leader block 42 of second reel 24 upon loading of data cartridge 18 into tape drive 12. Leader pin 48 enables tape drive 12 to extract magnetic data tape 22 from magnetic tape cartridge 18. Accordingly, tape 22 is delivered between reels 20 and 24.

Optionally, a leader section can be attached to the inner end of data tape 22 via a splice, with the leader section being attached to hub 44. Similarly, an optional leader section can be attached to the outer end of data tape 22, with the leader section being attached to leader pin 48. Further optionally, tape 22 can contain a segment of data tape 22 and a segment of abrasive cleaning tape. One way to accurately locate tape segments is to monitor rotation of tape reels as discussed above.

In normal operation, cassette 18 is loaded into tape drive 12 of FIG. 1. Hub 30 (of FIG. 3) is fed into engagement with second reel 28 (of FIG. 1) such that tape 22 is supported between reel 20 and reel 24 where it is stored by wrapping tape 22 about each reel 20 and 24. More particularly, tape 22 is wrapped onto reels 20 and 24 which are rotated so as to move tape 22 between such reels. Transducer head cleaner 13, comprising leader block 42 and cleaning surface 50, is positioned across one or more tape heads. Relative movement is imparted between cleaning surface 50 and transducer head 26, with such action resulting in the transducer head being cleaned. According to one implementation, as depicted in FIG. 4, transducer head 26 is moved laterally of the tape travel direction by actuator 72 in order to impart such cleaning action. According to another implementation, leader block 42 is moved back and forth via rotation of reels 20 and 24 to impart such cleaning action. According to yet a further implementation, transducer head 26 and leader block 42 are both moved to impart such cleaning action. Once cleaning has been implemented, a portion of data tape 22 can be run across such transducer heads in order to initialize tape placement, determine the need to clean such heads, as well as to determine whether cleaning has been performed sufficiently, or detect a deficient head condition.

According to one construction, data tape 22 comprises a standard recording tape on which a standard servo pattern has been recorded via a tape head. In operation, data tape 22 is used to support standard data cartridge load and unload operations, and is further used to assess the recording performance of a recording head. Use of data tape 22 within cartridge 18 allows a tape drive 12 to verify that transducer head performance is restored after cleaning.

Generally, there exist a number of features known in the art for getting a data tape into a tape drive, and getting it up and running. One such feature is a standard cartridge load algorithm. Such standard algorithms enable functionality within a tape drive and include a loading algorithm configured to enable loading of a data tape. Such a loading algorithm brings a tape up to speed, locks a servo onto the tape and reads servo code from the tape magnetic heads. Accordingly, such loading algorithm monitors specially written tracks that are provided on the data tape. Similarly, a standard unload algorithm can be used that relies on position marks recorded on the data tape.

Another standard algorithm is configured for moving an azimuth tilt head for alignment, and enabling power-on alignments. Accordingly, tape 22 (of FIG. 3) can enable such standard algorithms by way of formatting a segment of the data tape 22.

According to FIG. 2, control circuitry 30 can be implemented to sequentially identify each magnetic transducer head, and to assess whether each head is contaminated and is causing troubles by misreading data. For example, the level of magnetic head performance can be determined in order to quantify the level of cleaning needed to restore head functionality. If tape drive performance is not fully restored after a first cleaning operation, the data tape allows the tape drive to assess the condition of the transducer heads and initiate a second more aggressive recleaning if necessary without the need to load a separate data tape. Furthermore, the effectiveness of cleaning can be evaluated individually with each head, by sequentially monitoring and identifying the read/write capabilities of each head before and after cleaning. If the transducer heads cannot be cleaned and the tape drive performance cannot be restored, the tape drive can signal failure to restore performance to a host.

One example of implementing a performance evaluation for each head involves utilization of an error rate test, wherein one or more magnetic heads has difficulty reading/writing data because it is clogged with debris that has built up on the head. Such head clogging can be originally observed when reading/writing data from a data cartridge. Alternatively, such head problems can be observed by data tape 22 on data cartridge 18. By measuring the error rate on each head, the rate at which errors are made on each head can be assessed, followed by cleaning such head, and remeasuring or remonitoring the performance and comparing it with the original performance. When it is determined that the cleaned performance is not good enough, recleaning can be performed until the measured error rate is reduced or eliminated.

Single-reel type tape cartridges, as illustrated in FIG. 3, comprise a tape drive 12 and a cassette 18. It is well known in the art to provide a leader block 42, with leader block 42 being carried from reel 24, around roller guide 56, stationary guides 60, 58 and roller guide 54 by a mechanical mechanism (not shown). Accordingly, leader block 42 is presented adjacent roller guide 54 for insertion within exit aperture 66, upon loading of a data cassette 18 within tape drive 12. Leader block 42 removably engages with leader pin 48, via a leader pin receiver 55. Such receiver 55 comprises a releasable latch configured as a slot sized sufficiently to removably receive leader pin 48. Upon loading of cassette 18 within tape drive 12, such leader pin 48 is received within receiver 55, with reel 24 subsequently drawing leader block 42 back onto hub 46 so as to draw data tape 22 across transducer head 26.

FIG. 4 illustrates in greater detail the construction of one suitable transducer head cleaner 13 pursuant to Applicant's invention. More particularly, leader block 42 is provided with cleaning surface 50. According to one implementation, cleaning surface 50 comprises a brush 52 having a support base 70 securely affixed to a mounting surface 68 on leader block 42. Leader block 42 is positioned adjacent transducer head 26 by tensioning one of data tape 22 or leader tape 64 via reels 20, 24, spindles 38, 40, and drive motors 34, 36, respectively (see FIG. 2). Once brush 52 is placed into physical contact with transducer head 26, such positioning is held stationary. Subsequently, the transducer head is actuated for up-and-down movement by a linear actuator 72. Actuator 72 is shown in simplified form as a cylindrical body in FIGS. 3 and 4, with an actuator housing 74 providing a physical support structure for transducer head 26. It is understood that actuator 72 can be formed from any of a number of constructions presently understood in the art, wherein a linear-magnet displacement member enables movement of head 26 transverse to the travel direction of tape 22 and brush 52 such that read/write head elements on head 26 can be properly positioned onto tracks of information contained on tape 22. Furthermore, such transverse motion induces cleaning of transducer head 26 when placed into communication with brush 52. Actuator 72 is also implemented to position read/write head elements of transducer head 26 along tape 22 during normal tape drive operation.

According to the implementation depicted in FIG. 4, actuator 72 is used to impart up-and-down movement of transducer head 26 while it is engaged with brush 52 so as to provide scrubbing action therebetween. Such scrubbing, or cleaning, action can be imparted without physically moving brush 52. Furthermore, such cleaning action can be imparted without spooling data tape 22 back into the associated cartridge 18 (see FIG. 3), so it is much faster than prior art methods described previously. Furthermore, such implementation is simpler.

Cleaning brush 52 is provided on base 70 and leader block 42 with sufficient length such that leader block 42 clears transducer head 26, with cleaning brush 52 only contacting transducer head 26 there along. Leader block 42 is guided by leader block tracks 62 (as depicted in FIG. 6) such that leader block 42 is spaced apart from transducer head 26 so that contact only occurs with cleaning brush 52 along transducer head 26.

Accordingly, cleaning brush 52 is sized sufficiently to enable contact with transducer head 26 during a cleaning operation. While cleaning brush 52 is positioned along head 26, head 26 is actuated by a motor comprising linear actuator 72 for up-and-down movement, transverse the travel direction of tape 22, such that cleaning action is imparted between brush 52 and head 26.

According to one construction, cleaning brush 52 is formed from a statically dissipative, slightly conductive bristle material. One such bristle material comprises a reasonably conductive and soft nylon brush. Alternatively, a conductive carbon material can be utilized to form such cleaning brush. Further alternatively, stainless steel can be utilized to form cleaning brush 52. According to one implementation, cleaning brush 52 is oscillated one to two times per second while engaged with transducer head 26. Such action is carried out with sufficient duration to ensure cleaning of head 26.

As shown in FIG. 4, it is understood that transducer head cleaner 13 is formed from a cleaning brush 52. However, it is also understood that other cleaning devices can be mounted to leader block 42 in order to impart cleaning to transducer head 26. For example, any form of brush or pad that is capable of being contained within/along the drive leader block 42 of a linear tape drive tape leader 64 can be utilized.

According to the one preferred implementation depicted in FIG. 4, the tape drive leader block 42 comprises a hollow half-moon shaped part that has cutouts configured to form leader pin receiver 55 which removably and firmly grip cartridge leader pin 48. Leader block 42 connects to terminal end portion of data tape 22 as discussed above, and is pulled along a travel path, or track formed by leader block track 62 (as depicted in FIG. 6). Hence, leader block 42 extracts data tape 22 from cartridge 18 (of FIG. 3).

As depicted in FIG. 4, leader pin receiver 55 includes a spring-biased latch 76 and a pair of clasps 78 and 80. Latch 76 is urgably biased during loading of pin 48 within receiver 55 so as to enable pin 48 to be received within clasps 78 and 80. Similarly, pin 48 is retracted so as to urgably bias outwardly latch 76 to provide for clearing removal of pin 48 from within receiver 55.

FIG. 5 illustrates in greater detail the implementation of transducer head cleaner 13 depicted in FIG. 4. Accordingly, the construction details of brush 52 are more readily apparent.

FIG. 6 illustrates in greater detail the positioning of leader block 42 along leader block guide tracks 62, within tape drive 12. The travel path of leader block 42 can be readily seen in FIG. 6, extending along leader block track 62, from reel 46 to cassette 18 and back. Accordingly, the positioning of leader block 42 determines the path with which data tape 22 and leader tape 64 extend from block 42 to such hubs 44 and 46, respectively.

As shown in FIG. 6, leader tape 64 contacts roller guide 56. However, when leader block 42 is positioned within track 62, adjacent reel 24, leader tape 64 will not contact roller guide 56. Furthermore, leader block 42 is illustrated in a cleaning position, with brush 52 engaged against transducer head 26. According to such cleaning position, leader tape 64 and data tape 22 do not engage stationary guides 58 and 60.

Also depicted in FIG. 6, leader block 42 is incorporated into take-up reel 24, along hub 46. A cutout, or flat section, 82 is formed in hub 46 of reel 24 and is sized to accept leader block 42 as it winds onto take-up reel 24. Flat section 82 further includes a recess (not shown) sized to receive cleaning brush 52 therein when leader block 42 is positioned in communication with flat section 82. Furthermore, a corresponding aperture (not shown) is provided within leader tape 64 which nests in association with such recess so as to enable brush 52 to be received therein.

As illustrated in FIG. 6, head cleaner 13, here brush 52, is incorporated into the head-facing side of leader block 42 so as to ensure engagement with transducer head 26.

In operation, transducer head 26 is cleaned after loading cartridge 18 into tape drive 12. The motors driving reels 20 and 24 are energized, tensioning leader tape 64 and data tape 22. Leader tape 64 is taken up onto hub 46 of reel 24 until brush 52 is positioned into engagement with transducer head 26. Subsequently, linear actuator 72 is energized to move transducer head 26 transverse to tape 22 while in engagement with brush 52. Such activation of actuator 72 provides cross-tape motion of transducer head 46 against brush 52 which dislodges clogs present on head 26.

Following such cleaning operation, data tape 22 is then loaded onto take-up reel 24, via hub 46.

Additionally, or alternatively, if it is desirable to clean transducer head while cartridge 18 is being read from or written to, such recording/writing process is halted and reel 22 is used to spool data tape 22 onto hub 44 and back into cartridge 18. Such spooling is carried out sufficiently to present leader block 42 and brush 52 into contact with transducer head 26. Cleaning is then implemented as leader block 42 is passed into engagement with transducer head 26. Additionally, the simple motion of passing leader block 42 past transducer head 26 imparts cleaning to head 26. In order to continue the above-mentioned read/write process, data tape 22 is simply wound back onto reel 24 and hub 46.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A tape drive, comprising:
    a tape cartridge including a first tape having a leader pin;
    a tape carrier including a leader block and a hub, the leader block coupled with the hub via a second tape, the leader block configured to removably mate with the leader pin; and
    a cleaning surface provided on the leader block configured to be movably positioned into contact with a transducer head of the tape drive and operative to clean the transducer head.

2. The tape drive of claim 1 wherein the tape carrier comprises control circuitry and a motor operative to move the leader block so as to place the cleaning surface into communication with a transducer head to be cleaned.

3. The tape drive of claim 1 wherein the cleaning surface comprises a cleaning brush.

4. The tape drive of claim 1 wherein the first tape comprises a data tape having position data operative to determine position of the leader block relative to a transducer head to be cleaned.

5. The tape drive of claim 1 further comprising memory configured to retain information characterizing cleaning of a transducer head with the leader block.

6. The tape drive of claim 1 wherein the tape drive comprises a single-reel linear tape drive, the tape carrier comprises a take-up reel, and the second tape comprises a leader tape, the leader block connected to the take-up reel via the leader tape.

7. The tape drive of claim 1 further comprising a transducer head and a linear actuator operative to position the transducer head transverse to the tape.

8. The tape drive of claim 7 wherein the linear actuator is configured to move the transducer head while engaged with the cleaning surface to impart cleaning of the transducer head.

9. A linear tape drive, comprising:

a transducer head;

a tape carrier configured to carry a tape across the transducer head;

a leader block coupled with the tape carrier via a tape; and a cleaning surface provided on the leader block and configured to engage with the transducer head to impart cleaning thereto.

10. The tape drive of claim 9 wherein the transducer head further comprises a linear actuator, the linear actuator operable to move the transducer head while engaged with the cleaning surface so as to impart cleaning there along.

11. The tape drive of claim 9 wherein the cleaning surface comprises a cleaning brush.

12. The tape drive of claim 9 wherein the tape carrier comprises a motor, a hub, and a leader tape, the leader block coupled to the hub via the leader tape, the motor operable to position the leader block in association with the transducer head such that the cleaning surface is presented in engagement with the transducer head during a cleaning operation.

13. The tape drive of claim 9 further comprising control circuitry, the tape carrier further comprising at least one drive motor operative to move the leader block and cleaning surface relative to the transducer head, the control circuitry operative to enable the motor and engage the cleaning surface with the transducer head.

14. A method for cleaning a transducer head on a tape drive, comprising the steps of:

providing a tape cartridge having a tape and a leader pin;

providing a tape drive having a leader block including a cleaning surface;

receiving the tape cartridge into the tape drive and engaging the leader pin with the leader block;

positioning the leader block cleaning surface into engagement with a transducer head to be cleaned; and moving at least one of the leader block and the transducer head to effect cleaning of the transducer head.

15. The method as described in claim 14 comprising the additional step of providing the leader block on a leader tape of a hub within the tape drive.

16. The method as described in claim 14 wherein the step of moving comprises moving the transducer head while engaged with the cleaning surface in a direction transverse of the tape.

17. The method in accordance with claim 14 comprising detecting movable positioning of the at least one of the leader block and the transducer head to quantify the level of transducer head cleaning.

18. The method in accordance with claim 14 comprising detecting a level of contamination on the transducer head and advancing the leader block adjacent to the transducer head so as to engage the cleaning surface with the transducer head.

19. The method in accordance with claim 14 wherein the tape drive includes at least one motor and associated hub, the step of positioning the leader block comprising energizing the motor to rotate the hub and advance the tape thereabout so as to position the leader block cleaning surface into engagement with the transducer head.

20. The method in accordance with claim 14 wherein the tape drive comprises a single-reel linear tape drive.

* * * * *